(12) United States Patent
Manganaris et al.

(10) Patent No.: US 7,299,194 B1
(45) Date of Patent: Nov. 20, 2007

(54) METHOD AND SYSTEM FOR RESEARCHING SALES EFFECTS OF ADVERTISING USING ASSOCIATION ANALYSIS

(75) Inventors: Stefanos Manganaris, Durham, NC (US); Stephen Zeller, Haverford, PA (US); Keith Hermiz, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 09/510,416

(22) Filed: Feb. 22, 2000

(51) Int. Cl.
*G06F 17/30* (2006.01)
(52) U.S. Cl. ........................................................ 705/10
(58) Field of Classification Search ................. 705/10, 705/14
See application file for complete search history.

(56) References Cited

U.S. PATENT DOCUMENTS

| | | | |
|---|---|---|---|
| 4,630,108 A | 12/1986 | Gomersall | 358/84 |
| 4,752,675 A | 6/1988 | Zetmeir | 235/375 |
| 4,908,761 A * | 3/1990 | Tai | 705/14 |
| 4,972,504 A * | 11/1990 | Daniel et al. | 705/10 |
| 5,124,911 A | 6/1992 | Sack | 364/401 |
| 5,227,874 A * | 7/1993 | Von Kohorn | 705/10 |
| 5,331,544 A | 7/1994 | Lu et al. | 364/401 |
| 5,401,946 A * | 3/1995 | Weinblatt | 235/381 |
| 5,504,675 A | 4/1996 | Cragun et al. | 364/401 |
| 5,515,270 A * | 5/1996 | Weinblatt | 235/375 |
| 5,615,341 A * | 3/1997 | Agrawal et al. | 705/10 |
| 5,636,117 A | 6/1997 | Rothstein | 395/204 |
| 5,712,985 A | 1/1998 | Lee et al. | 395/207 |
| 5,774,868 A | 6/1998 | Cragun et al. | 705/10 |
| 5,794,209 A * | 8/1998 | Agrawal et al. | 705/10 |
| 5,857,175 A * | 1/1999 | Day et al. | 705/10 |
| 5,918,211 A * | 6/1999 | Sloane | 705/16 |
| 5,933,813 A * | 8/1999 | Teicher et al. | 705/26 |
| 5,974,396 A * | 10/1999 | Anderson et al. | 705/10 |
| 6,078,891 A * | 6/2000 | Riordan et al. | 705/10 |

(Continued)

FOREIGN PATENT DOCUMENTS

JP  07-073243  3/1995

(Continued)

OTHER PUBLICATIONS

Mena, Jesus. "Mining E-Customer Behavior," DB2 Magazine, Winter 1999 [retrieved from the Internet].*

(Continued)

*Primary Examiner*—C. Michelle Tarae
(74) *Attorney, Agent, or Firm*—Synnestvedt & Lechner LLP; John R. Pivnichny (57) ABSTRACT

A method and system for data mining is disclosed in which advertising/promotional events (e.g., the fact that a promotion was taking place when the transaction was recorded) are factored into association analysis of the data. Sales data is integrated with advertising data and a plurality of taxonomies are employed to link the merchandise data with the advertising data. This enhances the data so that the advertising status (advertised or non-advertised) can be determined and this information can be used to track the impact of advertising on product dynamics in market baskets and on sales. Further, for those articles that are advertised, detailed information about the advertising used is also available and integrated into the analysis so that, for example, the effectiveness or lack of effectiveness of a particular advertisement can be determined.

16 Claims, 7 Drawing Sheets

U.S. PATENT DOCUMENTS

| | | | |
|---|---|---|---|
| 6,141,010 A * | 10/2000 | Hoyle | 345/854 |
| 6,173,280 B1 * | 1/2001 | Ramkumar et al. | 707/6 |
| 6,182,070 B1 * | 1/2001 | Megiddo et al. | 707/6 |
| 6,189,005 B1 * | 2/2001 | Chakrabarti et al. | 707/6 |
| 6,212,544 B1 * | 4/2001 | Borkenhagen et al. | 709/103 |
| 6,230,064 B1 * | 5/2001 | Nakase et al. | 700/90 |
| 6,272,478 B1 * | 8/2001 | Obata et al. | 706/12 |
| 6,301,575 B1 * | 10/2001 | Chadha et al. | 707/2 |
| 6,317,722 B1 * | 11/2001 | Jacobi et al. | 705/14 |
| 6,334,109 B1 * | 12/2001 | Kanevsky et al. | 705/14 |
| 6,334,110 B1 * | 12/2001 | Walter et al. | 705/14 |
| 6,377,934 B1 * | 4/2002 | Chen et al. | 705/10 |
| 6,401,074 B1 * | 6/2002 | Sleeper | 705/14 |
| 6,415,287 B1 * | 7/2002 | Wang et al. | 707/6 |
| 6,470,079 B1 * | 10/2002 | Benson | 379/114.13 |
| 6,484,146 B2 * | 11/2002 | Day et al. | 705/14 |

FOREIGN PATENT DOCUMENTS

| | | |
|---|---|---|
| JP | 09-034957 | 2/1997 |

OTHER PUBLICATIONS

Saarenvirta, Gary. "Mining Customer Data," DB2 Magazine, Fall 1998 [retrieved from the Internet].*

Edelstein, Herb. "Mining for Gold," Information Week, Apr. 21, 1997 [retrieved from Proquest].*

* cited by examiner

| Category | Item/SKU |
|---|---|
| Beer | Heineken Six-pack 12Oz Bottle |
| Beer | Corona Six-Pack 12 Oz Can |
| Wine | Gallo Merlot |
| Wine | Kendall Jackson Pinot Noir |

Figure 6

| Department | Category |
|---|---|
| Alcoholic Beverages | Beer |
| Alcoholic Beverages | Wine |
| Non-Alcoholic Beverages | Soda |
| | |

| Flyer/Page | Item/SKU |
|---|---|
| 9/23 Phila. Inq./Front Page | Heineken Six-pack 12Oz Bottle |
| 9/23 Phila. Inq./Back Page | Heineken Six-pack 12Oz Bottle |
| 9/23 Phila. Inq./Front Page | Corona Six-Pack 12 Oz Can |
| 12/22 BCT/Back Page | Gallo Merlot |
| 12/22 BCT/Middle Insert | Kendall Jackson Pinot Noir |

Figure 9

| Flyer | Flyer/Page |
|---|---|
| 9/23 Phila. Inq. | 9/23 Phila. Inq./Front Page |
| 9/23 Phila. Inq. | 9/23 Phila. Inq./Back Page |
| 9/23 Phila. Inq. | 9/23 Phila. Inq./Front Page |
| 12/22 BCT | 12/22 BCT/Back Page |
| 12/22 BCT | 12/22 BCT/Middle Insert |

METHOD AND SYSTEM FOR RESEARCHING SALES EFFECTS OF ADVERTISING USING ASSOCIATION ANALYSIS

BACKGROUND OF THE INVENTION

1. Field of the Invention

The present invention relates to a method and system of data mining and, more particularly, to a method and system of data mining which uses association analysis to draw conclusions regarding the effect of advertising and sales promotions on product dynamics in market baskets.

2. Description of the Related Art

Data mining is a well known technology used to discover patterns and relationships in data. Data mining involves the application of advanced statistical analysis and modeling techniques to the data to find useful patterns and relationships. The resulting patterns and relationships are used in many applications in business to guide business actions and to make predictions helpful in planning future business actions.

One of the types of data mining is called "association analysis," often referred to as "market basket analysis." Association analysis reveals patterns in the form of "association rules" or "affinities." An association rule between products A and B can be expressed symbolically as A→B which translates to the statement: "Whenever product A is in a market basket, then product B tends to be in the market basket as well." This is an example of "product dynamics," i.e., the effect of the purchase of one product on another product.

In the folklore of data mining, one of the most repeated stories illustrating product dynamics is that of the alleged discovery that beer and diapers frequently appear together in a shopping basket. The explanation given in this tale is that when fathers are sent out on an errand to buy diapers, they often purchase a six pack of their favorite beer as a reward. Using the association rule discussed above, this example would be expressed as "diapers→beer" or, translated, whenever diapers appear in a shopping basket, beer also tends to appear in that shopping basket.

There are a number of measures that have historically been used to characterize the importance of a particular association rule. In the context of market basket analysis, these measures are calculated in relation to all market baskets under consideration. The "confidence" of a rule "A→B" is the probability that if a basket contains A it will also contain B. The "support" of a rule is the frequency of occurrence of the rule in the set of all transactions. The "lift" of the rule is a measure of the predictive power of the premise A. Lift is a multiplier for the probability of B in the presence of A versus the probability of B without any prior knowledge of other items in the market basket.

For purposes of explanation, consider the following example: Table 1 illustrates ten typical transactions representing the market baskets for a given day at a small store. From the data in the table, it can be seen that diapers and beer appear together in some market baskets and we can conclude that when a transaction contains diapers, there is a tendency for it to also contain beer. Diapers appear in six transactions (1, 3, 4, 8, 9, and 10) and beer appears in conjunction with diapers in four of these transactions (1, 3, 9, and 10). Therefore, the rule "diapers→beer" has a confidence of 4/6=67%. Further, there are four of the ten transactions where beer and diapers appear together. This results in a value of 4/10=40% for the support of the rule.

Finally, beer appears in five of the ten transactions while it appears in four of the six transactions containing diapers. This means that if a basket was randomly chosen without any prior information about any of the transactions, there is a 5/10=50% chance of finding beer. However, if we use the prior knowledge that if the basket contains diapers it has a good likelihood of also having beer, then the prospect of finding beer is improved if we choose from only baskets known to contain diapers, i.e., there is a 4/6=67% chance of finding beer. Thus, the lift of the rule "diapers→beer" is 67%/50%=1.34.

TABLE 1

| TRANSACTION | MARKET BASKET |
|---|---|
| 1 | Diapers, beer, chips, soap |
| 2 | Chips, soap |
| 3 | Diapers, beer, soap |
| 4 | Diapers, chips, soap |
| 5 | Soap |
| 6 | Chips |
| 7 | Beer, chips |
| 8 | Diapers |
| 9 | Diapers, beer, soap |
| 10 | Diapers, beer, chips, soap |

Association analysis techniques discover all association rules that exceed set support and confidence thresholds. They also discover all sets of items that tend to occur in the same basket with a frequency that exceeds the support threshold; such sets are termed "frequent itemsets."

In recognition of the importance of data mining, tools have been developed to perform the various data mining and modeling techniques. One such tool is Intelligent Miner™ sold by IBM. Intelligent Miner has an outstanding algorithm for association analysis as part of its tool suite. Being general purpose tools, Intelligent Miner and other data mining tools for association analysis reach the point of inferring frequent itemsets and rules with their corresponding metrics of interest, such as support, confidence, and lift, but go no further.

Association rules express facts deduced from data. They are true statements about the relationships observed in the data. These rules, along with their measures of confidence, support, and lift, can and should be used to generate theories or hypotheses about the effects of future actions that change the conditions under which the original observations were made. These hypotheses need to be posed in the complex and dynamic retail environment where potentially thousands of stores and tens of thousands of items must be considered against the backdrop of pricing actions, promotions, campaigns, seasonality, and product availability. Furthermore, all actions and results should be measured against a matrix of revenue and profit rather than the abstract notions of support, confidence, and lift.

Existing tools for association analysis do not factor in information about advertising and promotion and thus do not assist in developing theories or hypotheses about their effects on product sales and product dynamics in market baskets. Moreover, association analysis as commonly employed focuses on product dynamics and does not analyze the aggregate properties of individual baskets, referred to herein as market basket dynamics. If such analysis were conducted, it would yield data which would allow an understanding of overall buying behavior, measured at the level of market baskets, and what drives the overall buying behavior. Currently implemented association rules and frequent itemsets do not assist in determining information about the overall buying habits of the owner of a particular type of market basket; for example, what kinds of products would be found in a "high-gross margin" baskets or which products may drive such "high-gross margin" baskets.

Analysis of market basket data using data mining techniques, such as association analysis, is a recent development. Traditional methods for evaluating the effects of advertising and promotions on sales for a particular item of interest focus on aggregate financial measures. For example, traditional approaches would measure the overall value of shopping baskets that include or do not include the item of interest and compute how these measures change as a function of promotion-related actions. These methods do not consider the overall content of shopping baskets (i.e., they focus only on items of interest) and thus do not explain what these baskets tend to contain, nor do they reveal data which allows analysis of market basket dynamics. Without information about the relationships between the sale of various items and their promotion status it is not possible to explain any observed changes in the aggregate measures. Moreover, by lumping together all baskets that contain the item of interest to compute an aggregate value, these methods do not allow for the possibility of having various types of baskets all containing the item of interest but with different dynamics and thus different aggregate values.

Accordingly, a need exists for a method and system for utilizing data mining techniques to understand buying behavior which factors in advertising and promotional actions on purchasing behavior.

SUMMARY OF THE INVENTION

An object of the present invention is to provide a method and system for data mining in which the premise and/or conclusion of an association rule can include promotional or advertising events (e.g., the fact that a promotion was taking place when the transaction was recorded). Sales data is integrated with advertising data and a plurality of taxonomies are employed to link the merchandise data with the advertising data. This enhances the data so that the advertising status (advertised or non-advertised) can be determined and this information can be used to track the impact of advertising on product dynamics in market baskets. Further, for those articles that are advertised, detailed information about the advertising used is also available and integrated into the analysis so that, for example, the effectiveness or lack of effectiveness of a particular advertisement, or elements thereof, can be determined.

Other objects and advantages of the present invention will be set forth in part in the description and the drawings which follow, and, in part, will be obvious from the description or may be learned by practice of the invention.

To achieve the foregoing objects, and in accordance with the purpose of the invention as broadly described herein, the present invention provides a computer-implemented method of processing market research data, including sales data concerning items sold during retail sales transactions of a retailer and advertising/promotion data concerning the sold items, the method comprising the steps of receiving the sales data; receiving the advertising/promotion data; enhancing the sales data by embedding elements of the advertising/promotion data in the sales data; performing association analysis on the enhanced sales data to generate association rules; and displaying and archiving the association rules.

The present invention will now be described with reference to the following drawings, in which like reference numbers denote the same elements throughout.

DETAILED DESCRIPTION OF THE PREFERRED EMBODIMENTS

Figure 1:
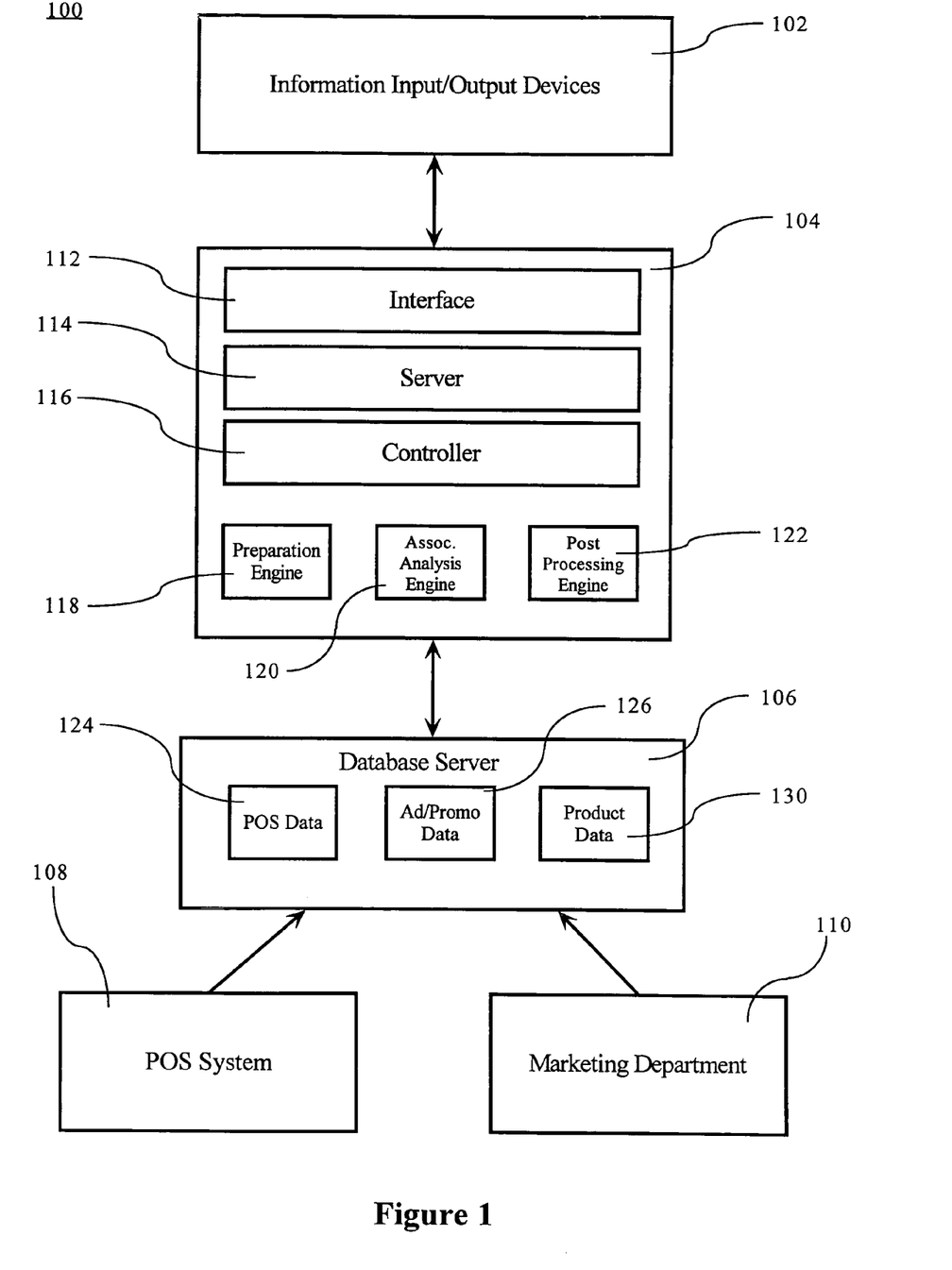
FIG. 1 is a block diagram of the functional components of a system constructed in accordance with the present invention.

FIG. 1 illustrates an overview of the functional components of a system 100 for researching the sales effects of advertising using association analysis in accordance with the present invention. While the examples given herein are directed to a standard retail environment, the present invention is not limited to such an application, and it is clear that the principles and methods of the present invention can find application in numerous other settings including electronic commerce ("E-Commerce") over the Internet and any other application in which it is desirable to analyze the effect of advertising or promotion on consumer behavior.

As used herein, the term "Retailer" refers to a person or organization needing analysis of data and conclusions derived from the data. Examples of typical Retailers include the marketing department of a retail store or E-Commerce organization, a buyer for a retail store, or a website designer designing a website for an E-Commerce organization.

As used herein, the term "User" refers to a person, organization, or automated device that uses the present invention in connection with input from a Retailer to provide the desired data analysis and conclusions. Examples of typical users include a market analysis organization, a retailer who possesses a system in accordance with the present invention, or a web designer for an E-Commerce organization that has access to a system in accordance with the present invention.

As used herein, the term "Purchaser" refers to a customer of a Retailer who purchases items from the Retailer. Examples of typical Purchasers include an individual shopper at a retail store or an individual making purchases over the Internet from an E-Commerce organization.

The system 100 includes Retailer information input/output devices 102, an analysis server 104, a database server 106 and data input devices 108, 110. Retailer information input devices 102 provide means for inputting to the system information regarding the needs and desires of a particular Retailer. The Retailer information can be manually input by the User of the system via, for example, a standard keyboard; in this scenario, the Retailer information is manually gathered by the User by interview, questionnaire, or other known information-gathering techniques. In a preferred embodiment, the Retailer directly inputs the Retailer information by filling out an electronic questionnaire or interview form available on a website of the User, thereby transmitting the information to analysis server 104 via the Internet.

Analysis server 104 performs the association analysis on all data input thereto. The general operation of the analysis server 104 is based on the use of well known systems and tools such as IBM's Intelligent Miner discussed above. As described more fully below, however, it is the utilization of the data mining tools, the enhancement of the data analyzed by the data mining tools and the post-processing and interpretation of the findings that represent some of the novel aspects of the present invention.

Database server 106 stores selected point-of-sale (POS) data, advertising and promotion data, and product data, all of which is obtained from a variety of general data sources, including POS systems 108, marketing department databases 110 and the like.

Each of the elements of the system can communicate with each other in any known manner, for example, over a network connection or via standard cabling. Analysis server 104 includes an interface 112, a server 114 (e.g., an HTTP or Internet web server) and a controller 116. Interface 112 allows the analysis server 104 and the other elements of the system to communicate with each other in a known manner. Server 114 manages communications between the input devices 102 and the database server 106 in a known manner. Controller 116 controls the operation of server 114, including all communications between preparation engine 118, association analysis engine 120 and post-processing engine 122. In general, preparation engine 118, association analysis engine 120, and post-processing engine 122 are known components found in most data mining systems. However, the preparation engine 118 and post-processing engine 122 are utilized in a novel manner to achieve the results of the present invention, as described in more detail below.

Figure 2:
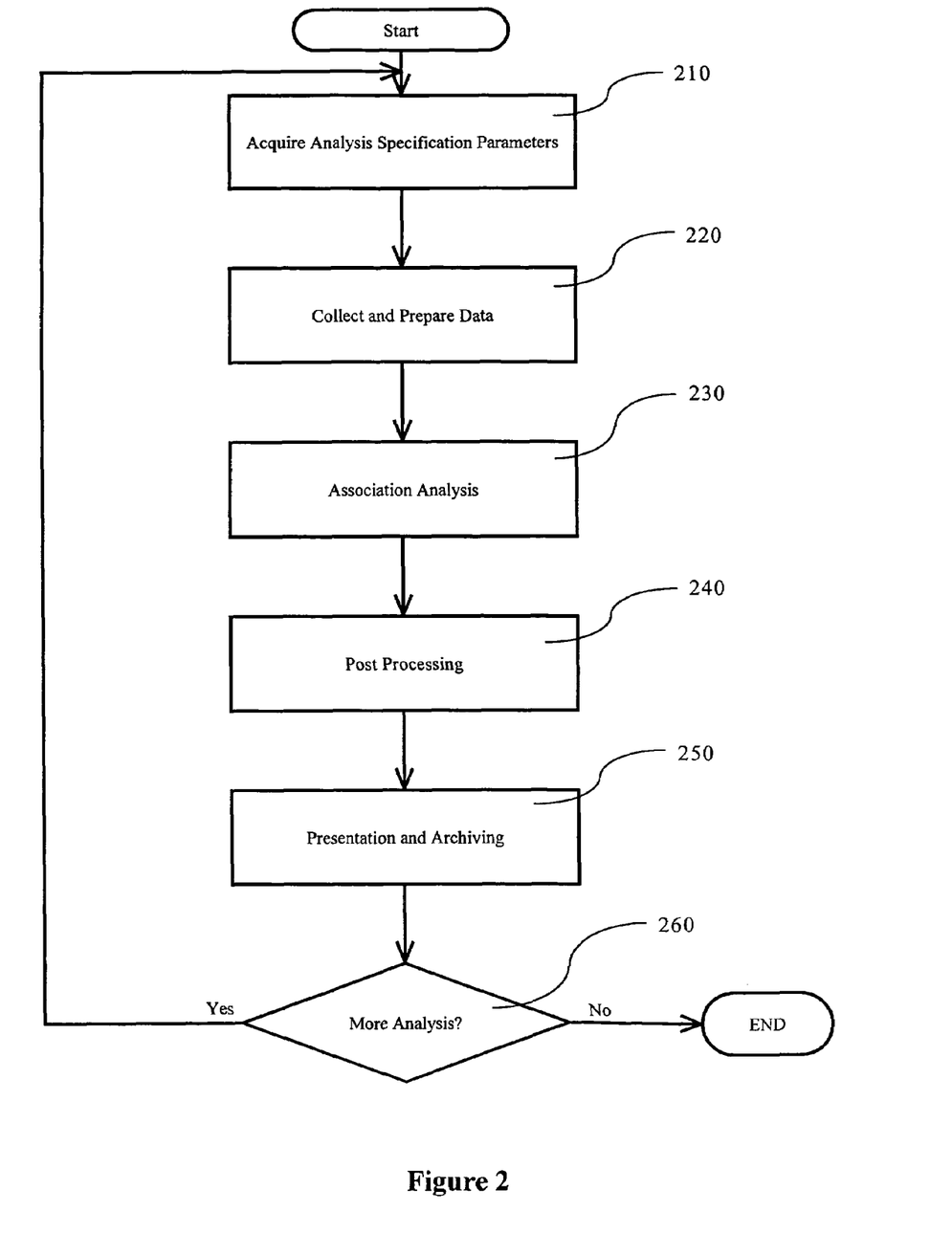
FIG. 2 is a high level flowchart illustrating the overall process of the present invention.

FIG. 2 is a high level flowchart illustrating the overall process of the present invention. At step 210 analysis and specification parameters are acquired. These parameters are input to the system via a Retailer input device (e.g., one of the Retailer input devices 102 of FIG. 1) and define what it is that the Retailer is interested in knowing about. This information could include, for example, details regarding which POS data the Retailer is interested in analyzing (store locations, specific time periods, product lines); which hierarchy to use (e.g., merchandise and/or advertisement taxonomy, described below); minimum support and confidence thresholds, and item constraints (e.g., which product item(s) to include or exclude from the analysis).

At step 220 the data required to perform the various analyses requested by the Retailer in step 210 is collected and prepared. The collection aspect of step 220 involves the gathering of selected data from the general data sources, for example, the POS system databases 108 and marketing department databases 110, by the database server 106. This assures that only necessary information is utilized and unnecessary information is excluded.

The preparation aspect of step 220 involves the preparing of the collected data for association analysis by assigning identification numbers for each of the events or items under scrutiny (adding identification and transaction information), for example a particular market basket and the items in the market basket; inserting the data for the revenue resulting from the sale of each item and the cost of each item (financial information); and adding details of any advertising that may have been done for each item. The exact data inserted will depend on the analysis requested by the Retailer and may be very detailed or only very general in nature. All of the data to be inserted is available from the POS system database 108 and the marketing department database 110.

In accordance with the present invention, the data is also enhanced, as described further below, by (a) embedding the data with information regarding advertisements and promotions; and/or (b) by identifying the aggregate characteristics of each market basket and embedding the market basket data with information regarding these aggregate properties. The preparation step allows the association analysis step at block 230 to take into account and process the parameters requested by the Retailer and the enhancement of the data enables the present invention to provide the Retailer with additional relevant information that is not available using prior-art market basket analysis methods.

At step 230, an association analysis is performed in a known manner using standard association analysis algorithms to process the data that has been collected and enhanced in step 220. In a well-known manner, the association analysis step generates association rules for the data. However, as discussed below, the rules are much more useful because of the enhancements introduced in step 220. Thus, the post-processing steps performed on the enhanced data at step 240 (described in more detail below with respect to FIG. 11) involve processing of the data based on parameters not considered by prior art systems, and thereby yield significantly better information for presentation and archiving at step 250.

Finally, at step 260 a determination is made as to whether additional analysis is required or desired. If not, the process ends. However, if more analysis is required, then the process returns to step 210 and begins again. There are numerous situations when additional analysis might be required. For example, it may be desired by the Retailer to run an analysis before a promotion is implemented, during the promotion, and after the promotion has ended so that changes in purchasing behavior can be identified and evaluated; to compare different stores or groups of stores (e.g., on a regional level); or to run an analysis of products at both a category level and a department level.

Figure 3:
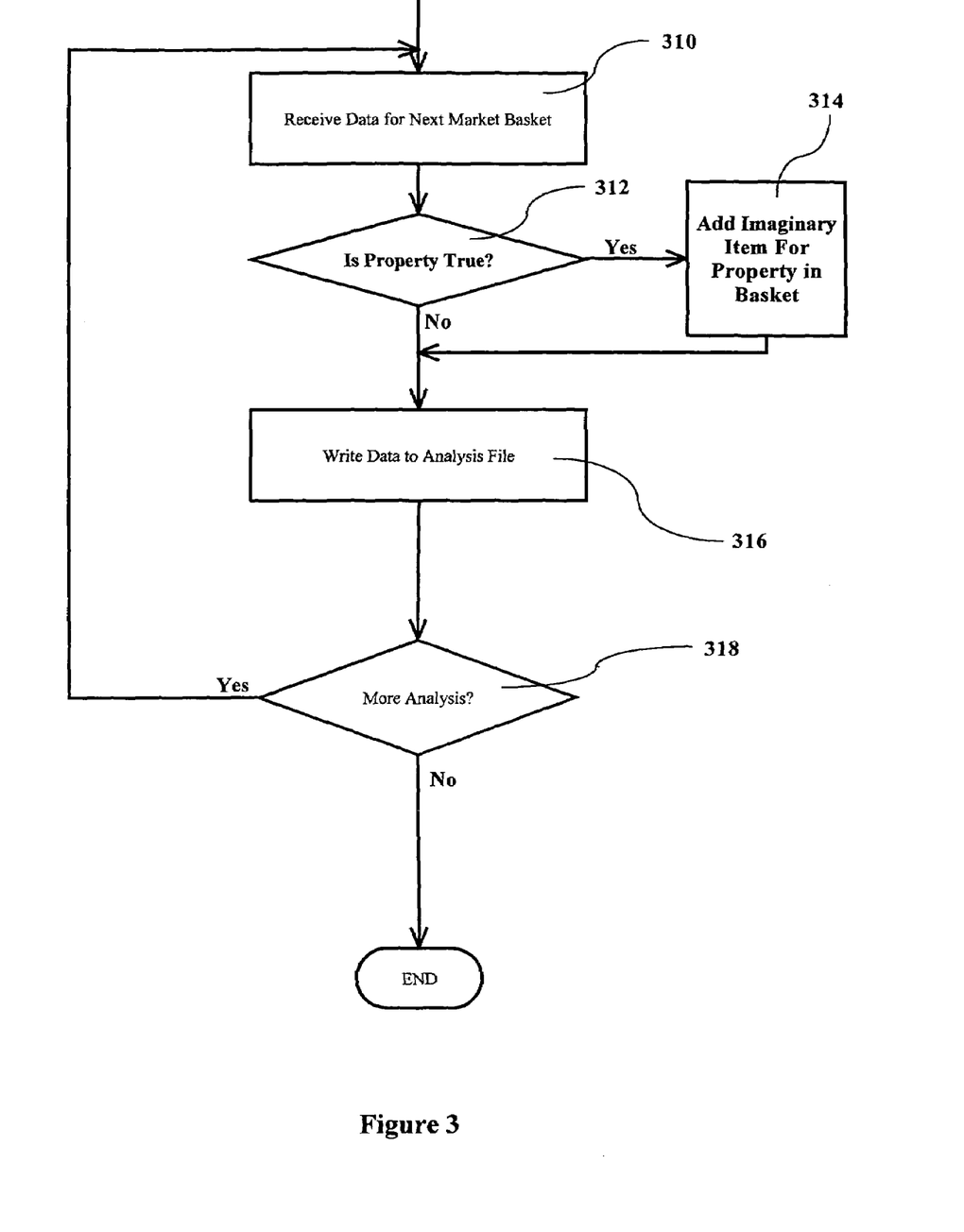
FIG. 3 is a flowchart illustrating the aggregate property enhancement process block of FIG. 2.

FIG. 3 is a flowchart illustrating what is referred to herein as the "aggregate property" enhancement process of block 220 of FIG. 2 The aggregate-property enhancement process illustrated with respect to FIG. 3 enables the discovery of patterns that characterize or discriminate market baskets having particular overall properties, i.e., the market basket dynamics. Aggregate properties of a market basket would be, for example, a market basket that has an overall negative gross margin or a market basket that has an overall "high" gross margin. As shown in FIG. 3, a logical grouping of data (e.g., all the items contained in a market basket) are identified as possessing, as a whole, one or more specified properties.

Referring now to FIG. 3, at step 310, data pertaining to a particular market basket (e.g., the market basket of Purchaser "David" on August 30th) is input and, at step 312, a determination is made as to whether or not a specified property about the market basket is true. Thus, for example, if the specified property being analyzed is the gross margin of the entire basket, and the Retailer has determined that a "high" gross margin market basket would be any basket that has an overall gross margin exceeding $50, at step 312, if the market basket input at step 310 has a gross margin that is $50 or less, the process proceeds to step 316 and the ordinary "non-enhanced" market basket information is written to the analysis file, and at step 318, a determination is made as to whether or not there is another market basket to be analyzed. If there are no additional market baskets to be analyzed, the process ends; if there is another market basket to be analyzed, the process proceeds back to step 310 and the process is continues until all baskets have been analyzed.

If, at step 312, it is determined that the property "gross margin" of the market basket "David" is high, i.e., that it exceeds $50, then at step 314 a designation indicating the existence of this property "added" to the basket to identify this property as a characteristic of the basket. These designations are referred to as "imaginary items" and enhance the market basket data by categorizing the market basket as possessing the designated property. As an example, at step 314, an imaginary item "HM" is "added" to the basket (i.e., the market basket data is modified to include a designation "HM") to indicate that the basket is a high margin basket. The addition of the imaginary item can comprise a simple coding process, wherein an identifier is added to the data for the market basket "David" which, in this example, identifies the basket as a high margin basket. Each imaginary item type requested by the retailer must have a different code so that they can be distinguished from each other, and it is also desirable, for efficiency, to make the imaginary items easily distinguishable from real items.

The process then proceeds to step 316 where the market basket information, including the now enhanced basket information, is written to the analysis file. The process may be repeated for as many properties as desired so that a basket may possess plural imaginary items identifying plural aggregate properties of the basket.

As noted above, in addition to characterizing market baskets, the present invention also enables analysis of the effects of advertising/promotion on the sale of products. During the advertising/promotional enhancement process all items in the database are classified using a standard merchandise taxonomy; at the same time, however, the items are also classified using an advertisement taxonomy, which enables association analysis to produce patterns that involve elements of the advertising media used. These taxonomies are described in more detail below with respect to FIGS. 5-10.

Figure 4:
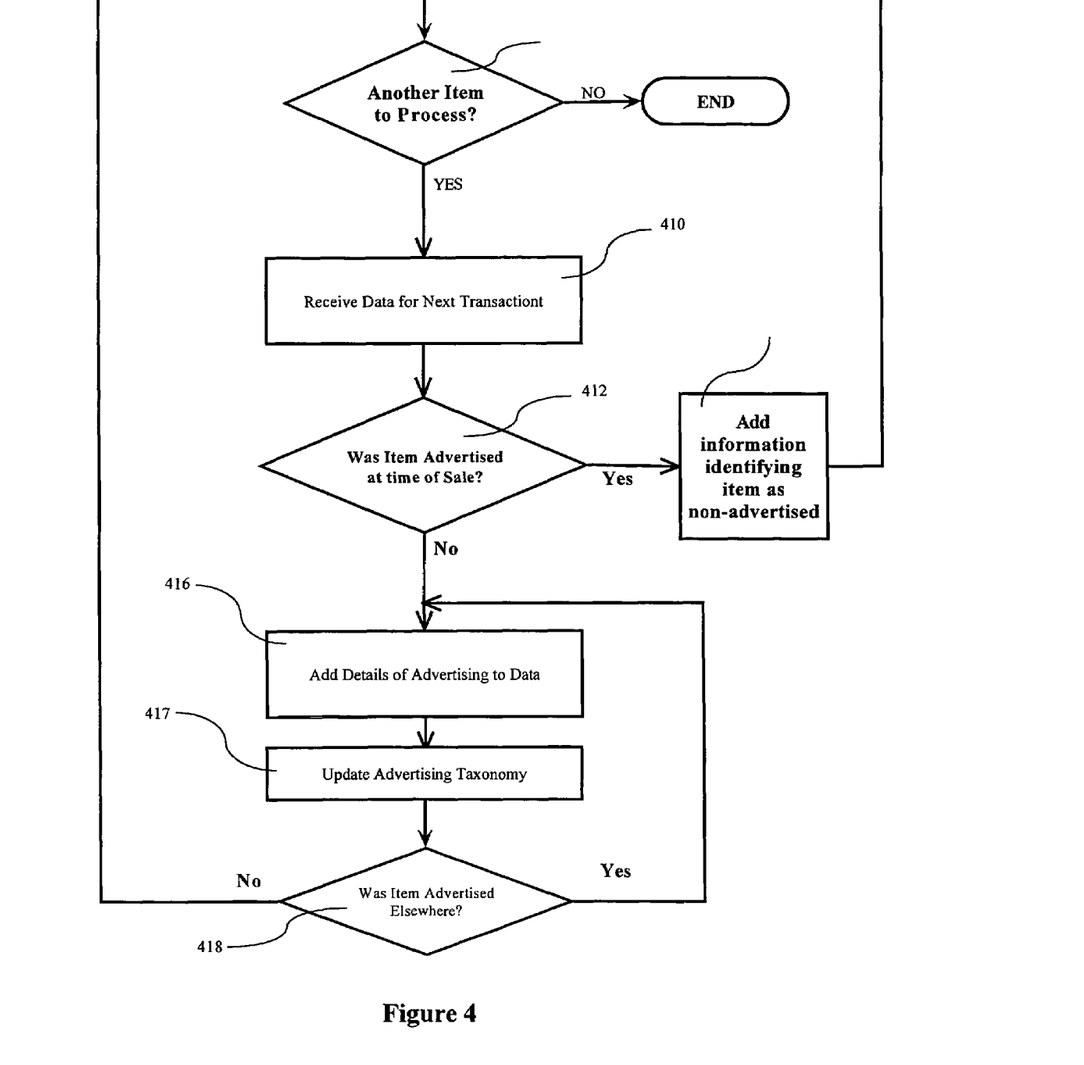
FIG. 4 is a flowchart illustrating the advertising/promotional enhancement block of FIG. 2.

FIG. 4 is a flowchart illustrating what is referred to herein as the "advertising/promotional enhancement" process of block 220 of FIG. 2. This process enables association analysis to take into account the advertising status for items at the time of sale. Referring now to FIG. 4, at step 410 data pertaining to a next (or first) item in a sequence of transactions is obtained. This data comprises information regarding an individual purchase of an item in a market basket. At step 412, a determination is made as to whether or not the item was being advertised and/or promoted when it was purchased (based on data gathered during step 220 of FIG. 2). If it is determined that the item was not advertised or promoted, at step 414 information is added to the data corresponding to the item to create an "enhanced item" that identifies the item as a non-advertised item, and the process proceeds back to step 410.

If, at step 412, it is determined that the item was advertised or promoted when it was purchased, then at step 416 the item is designated as being an advertised item, details of the advertisement are added to enhance the data pertaining to the item. These details may include low-level elements of the advertising media such as the particular quadrant of a page on which an advertisement appeared, high-level elements of the advertising media such as the year in which an advertisement appeared, or mid-level details falling between the low and high-level elements. The advertising elements are used in an advertising taxonomy, described below with respect to FIGS. 8-10, to allow the advertising information to be associated with other pertinent information.

Next, the process proceeds to step 418 to determine if the same product was advertised in another advertisement when it was purchased. This is done because many times a single product is advertised in multiple locations, by different methods, etc. If it is determined that there was another advertisement running for the same product when it was purchased, then it is flagged as such and the process proceeds back to step 416 so that the item may be designated as being advertised more than once and the details regarding the additional advertising/promotion programs can be added. This can be accomplished by, for example, introducing a replica of the enhanced item data into the market basket, changing only the information specific to the additional advertisement(s). This is repeated until it is determined that there are no more additional ads/promotions for the item, at which point the process proceeds back to step 410 and continues until all transactions/items have been processed.

Figure 5:
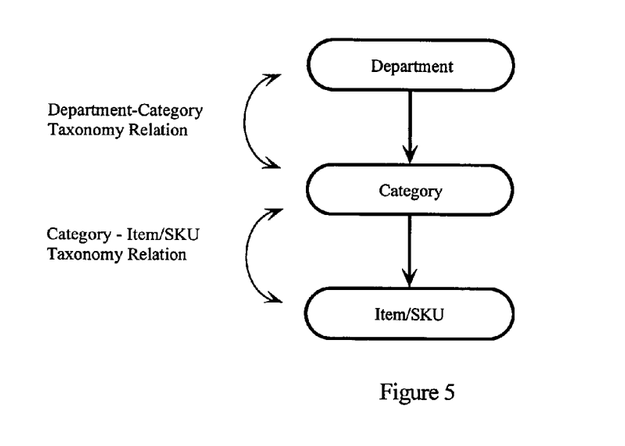
FIG. 5 illustrates a three-level merchandising taxonomy.

In order to be able to use the enhanced data in association analysis, each item in the database is classified using a standard merchandise taxonomy, as well as an advertisement taxonomy. This classification process is described with reference to FIGS. 5-10. Referring now to FIG. 5, a simple 3-level merchandising taxonomy is described. In practical application, the merchandise taxonomy could consist of many more levels, depending on the desired level of "resolution" of the data analysis and the organization of the business of the Retailer.

The idea behind any taxonomy classification is to establish links between various levels of classification so that "children" within the taxonomy can be linked to items of common "ancestry." For example, the merchandise taxonomy of FIG. 5 shows a three-level taxonomy populated with typical, basic sales data: a Department level; a Category level; and an Item or SKU (e.g., any product identification code used in the retail industry) level. Taking beverages as an example of a particular type of merchandise, at the Department level, the descriptions might be "alcoholic beverages," "non-alcoholic beverages"; at the Category level, the descriptions might be "beer," "wine," "cordials"; and at the Item level, the descriptions might be "Heineken six-pack 12 Oz. Bottles,""Corona six-pack 12 Oz. Cans," "Gallo Merlot 750 ml.," "Kendall Jackson Pinot Noir 750 ml."

Figure 6:
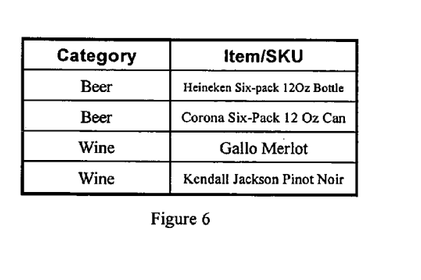
FIG. 6 illustrates a taxonomy relation table linking the category level to the SKU level of the taxonomy illustrated in FIG. 5.

To be able to use this information, relationships have to be established to link this information from the lowest level to the highest level. For example, FIG. 6 illustrates a taxonomy relation table (exemplary information illustrated only) linking the Category level to the Item level for the previously described example. As can be seen in FIG. 6, Item's "Heineken six-pack 12 Oz. Bottles" and "Corona six-pack 12 Oz. Cans" are each associated or linked to the category "Beer"; and Item's "Gallo Merlot" and "Kendall Jackson Pinot Noir" are associated with the category "Wine."

Figure 7:
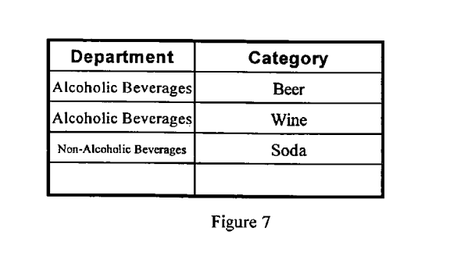
FIG. 7 illustrates a taxonomy relation table linking the category level to the department level for the taxonomy illustrated in FIG. 5.

FIG. 7 illustrates a taxonomy relation table linking the Category level to the Department level for the same example. As can be seen in FIG. 7, each of the categories "Beer" and "Wine" are separately associated with the Department "Alcoholic Beverages." Creation of these taxonomies is what enables association analysis to identify patterns that involve items at various levels, and this is especially important when low-level, less-frequently occurring items are involved. Such items do not allow patterns to be easily established on their own; with the taxonomies, however, these low level items may be considered at a higher level where patterns may be more easily established (e.g., if "Gallo Merlot" is infrequently purchased, advertising for the category "Wines" may be analyzed instead, since the taxonomy establishes the link to both the low-level and higher-level categories.

A novel aspect of the present invention is the use of association analysis to associate elements of the advertising media at various levels with each other, as well as with items in the merchandise taxonomy. Obviously this "cross-taxonomy association" is not limited to these two taxonomies and it is understood that other taxonomies could be associated with each other as well.

Figure 8:
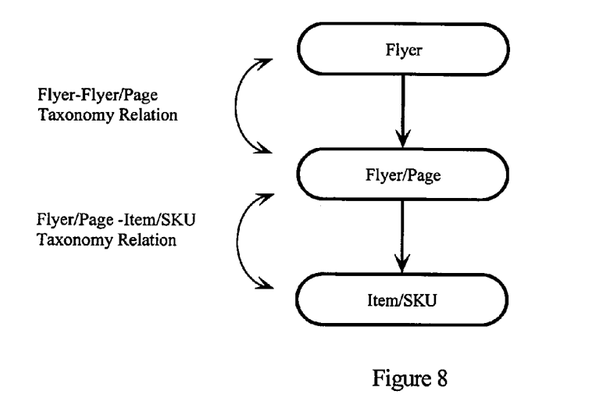
FIG. 8 illustrates a three-level advertising taxonomy.

FIG. 8 illustrates a simple 3-level advertising taxonomy. This taxonomy also comprises three levels populated with advertising/promotion data: a Flyer level; a Flyer/Page level; and an Item level. By using a level (Item level) that is also used in the merchandise taxonomy, a link is established between the two taxonomies so that correlations between the two taxonomies can be made. As with the merchandise taxonomy described above, the addition of more levels in the taxonomy will increase the resolution of the analysis. Continuing with the same example, at the Flyer level, the description might be "September 23rd Philadelphia Inquirer Flyers"; "September 30th Philadelphia Inquirer Flyers"; ... , December $22^{nd}$ Philadelphia Inquirer Flyers", etc.; for the Flyers/Page level, the descriptions might be "September 23rd Philadelphia Inquirer Flyer, Page 2"; December $22^{nd}$ Burlington County Times Flyer, back page"; and for the Item level, the descriptions would be the same as for the merchandise taxonomy.

Figure 9:
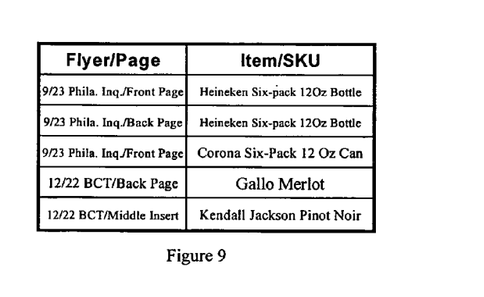
FIG. 9 illustrates a taxonomy relation table linking an item level to a flyer/page level of the advertising taxonomy illustrated in FIG. 8.

FIG. 9 illustrates a taxonomy relation table linking an Item level to a "Flyer/Page" level of an advertising piece according to this example. The "Flyer/Page" level refers to a particular page of a particular advertising flyer on a specific date. Referring to FIG. 9, it can be seen that the Item "Heineken six-pack 12 Oz. Bottles" is associated with Flyer/Page "Philadelphia Inquirer, September $23^{rd}$/Front Page", which means that an advertisement for the Heineken Item of the example appeared on the front page of a flyer that was included in the September $23^{rd}$ edition of the Philadelphia Inquirer. Similarly, the Corona Item of the example is associated with the same advertising page and date ("Philadelphia Inquirer, September 23rd/Front Page"); the Gallo Merlot Item is associated with the back page of a December 22nd flyer included with the Burlington County Times ("Burlington County Times/December 22nd/Back Page"); and the Kendall Jackson Item is associated with the middle insert of the December $22^{nd}$ Burlington County Times flyer ("Burlington County Times/December 22nd/Middle Insert"). Note that the Heineken Item was also advertised on the back page of the September 23rd Philadelphia Inquirer.

Figure 10:
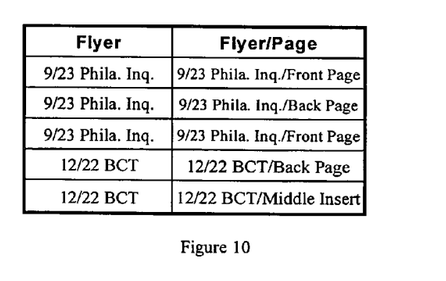
FIG. 10 illustrates a taxonomy relation table linking the flyer/page level to the flyer level of the advertising taxonomy illustrated in FIG. 8.

Likewise, FIG. 10 illustrates a taxonomy relation table linking the "Flyer/Page" level of the taxonomy to the "Flyer" level (e.g., The front page of the September 23rd Philadelphia Inquirer flyer is associated with the September $23^{rd}$ Philadelphia Inquirer flyer). Through this simple example, it can be seen that the advertising for a particular Item can be associated with a particular page or pages in an advertisement, and/or a particular advertising date for a particular publication.

The taxonomy relations that are illustrated in FIGS. 5-10 set up the use of these taxonomies in performing the association analysis. These relationships are utilized, as described above, to enhance the market basket data prior to subjecting the data to association analysis. In a known manner, the Items in the merchandise taxonomy can be linked to advertisements (if any) in the advertising taxonomy.

Figure 11:
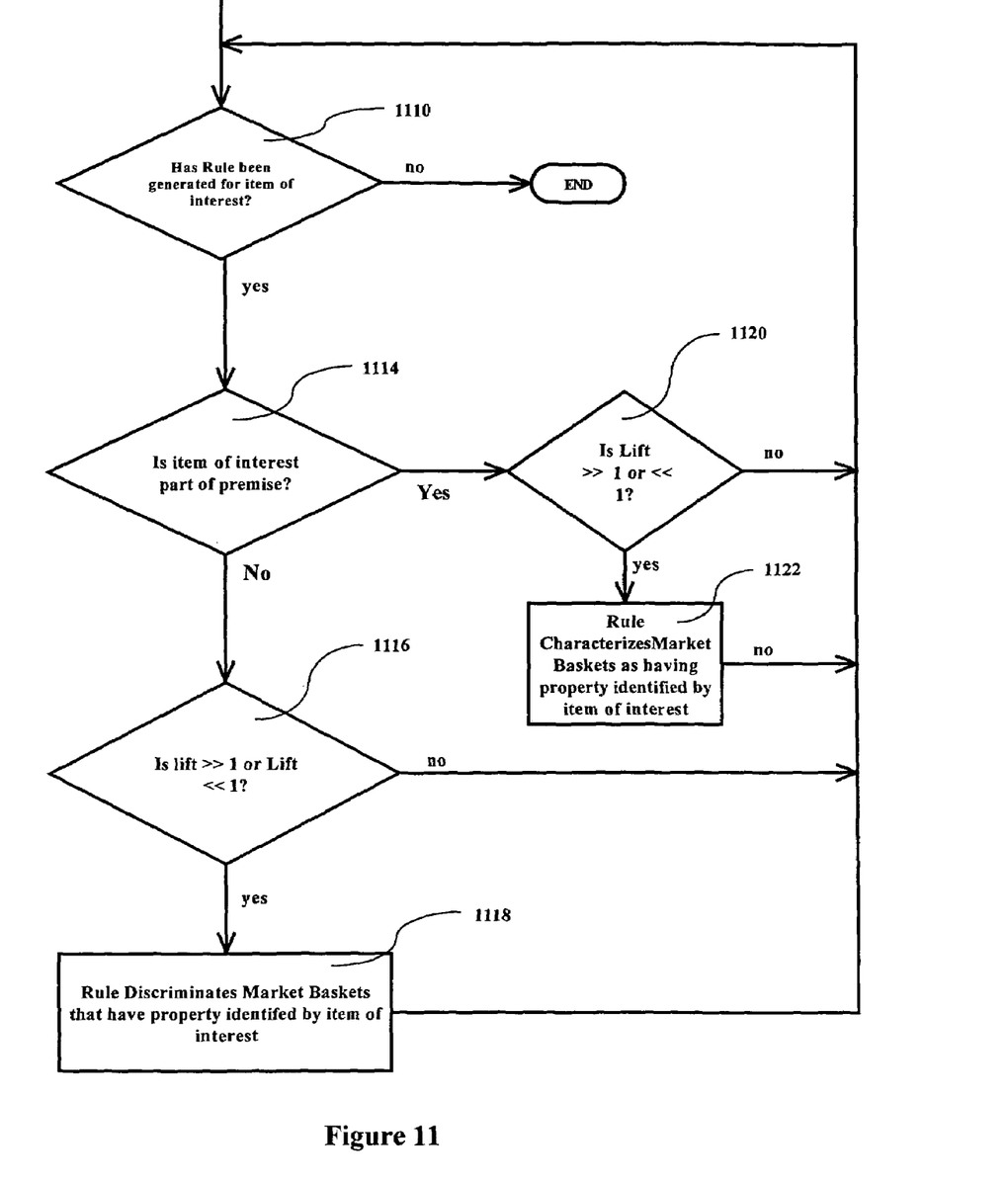
FIG. 11 is a flowchart illustrating one example of the post-processing step of FIG. 2.

FIG. 11 is a flowchart illustrating one example of post-processing step 240 of FIG. 2 and, in particular, a post-processing step for identifying patterns that characterize or discriminate market baskets with particular aggregate properties. As previously discussed, the association analysis step performed at step 230 of FIG. 2 generates a series of rules which characterize each market basket, and many of these rules may have been enhanced by use of imaginary items, enhanced items, and/or taxonomies during the preparation of the data for processing. During the post-processing step, the analyzed, enhanced data is used to develop conclusions about the data.

Referring to FIG. 11, at step 1110, a determination is made as to whether or not a rule has been generated by the association analysis step for the item of interest, for example, for imaginary item HM. If no rule is found, this indicates that the analysis is complete and the process terminates at that point. However, if at step 1110 it is determined that the next rule to be processed involves the item of interest, then at step 1114, a determination is made as to whether or not the item of interest is part of the premise (e.g., before the arrow) of the rule or the consequent (e.g., after the arrow) of the rule. For example, if the item of interest is imaginary item HM, and if item HM is part of the premise of the rule (e.g., HM→A+B, meaning "whenever a high margin basket occurs, it tends to include both A and B"), the process proceeds to step 1120 and the lift value, which was calculated during the association analysis step, is analyzed. If, for example, it is determined that the lift is much greater or much less than 1, then it is considered an "interesting" rule (i.e., of interest to the Retailer) and the process proceeds to step 1122 where the rule is deemed to characterize market baskets that have the property HM as being high margin baskets (and allows the inference that there is a good likelihood that the basket contains A and B) and then the process proceeds back to step 1110. If the lift is found to be at or near 1, the rule is considered "uninteresting" and it is not designated as having any particular property, and the process proceeds back to step 1110.

If, on the other hand, at step 1114 it is determined that item HM is not part of the premise (i.e., that item HM is part of the consequent, e.g., A+B→HM, meaning "whenever A and B occur together in a market basket, then it is a high margin basket"), then at step 1116, a determination is made as to whether the lift value is much greater or much less than 1. If the lift value is much greater or much less than 1, then at step 1118 the rule is deemed to discriminate market baskets that have the property HM from other baskets that do not have this property (and allows the inference that since the basket contains items A and B, there is a high likelihood that the basket is a high margin basket) and then the process proceeds back to step 1110. If, at step 1116, there is a determination made that the lift value is at or nearly 1, then the process just reverts back to step 1110.

Although the present invention is described in connection with marketing research, it is understood that the techniques and methods described herein can be applied to any type of research in which it is desired to characterize data groupings and/or analyze the effects of a particular parameter (e.g., other than advertising). Further, it is understood that the properties of the market baskets can include information other than financial information, for example, a market basket can be characterized as containing advertised and/or non-advertised items and this information can be used by researchers as well.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A computer-implemented method of processing market research data including sales data concerning items sold during retail sales transactions of a retailer and advertising/promotion data concerning said sold items, said method comprising the steps of:
   receiving said sales data;
   receiving said advertising/promotion data;
   enhancing said sales data by embedding elements of said advertising/promotion data in said sales data;
   performing association analysis on said enhanced sales data to generate association rules and frequent itemsets that identify:
      market baskets associated with said retail sales transactions; and
      which of said items sold are associated with each of said market baskets; and
   displaying and archiving said association rules and frequent itemsets.

2. The method as set forth in claim 1, further comprising the step of:
   processing said association rules and frequent itemsets to develop conclusions about said marketing research data.

3. The method as set forth in claim 2, wherein said sales data comprises merchandise information, said merchandise information including:
   identification information identifying each sold item;
   transactional information corresponding to each sold item; and
   financial information corresponding to each sold item;
   and wherein said merchandise information is input to a merchandise taxonomy to establish logical links between said identification information, said transactional information, and said financial information so that said merchandise information can be utilized for market basket analysis.

4. The method as set forth in claim 3, wherein said advertising/promotional data comprises information identifying the advertising status of each item, and wherein said advertising status information is embedded in said merchandising information to establish a logical link between said merchandise information and said advertising/promotional data to create said enhanced sales data.

5. The method as set forth in claim 3, wherein said advertising/promotional data comprises:
   information identifying items that have been advertised; and
   for said advertised items, information identifying how the item was advertised, the date the item was advertised, and where the item was advertised; and wherein said advertising information is embedded in said merchandising information to establish a logical link between said merchandise information and said advertising/promotional data, thereby creating said enhanced sales data.

6. The method as set forth in claim 5, wherein said information identifying how each advertised item was advertised includes an identification of the advertising medium used and the placement of the advertisement in the advertising medium.

7. The method as set forth in claim 6, wherein said enhancing step comprises the steps of:
   classifying said advertising/promotion information in an advertising/promotion taxonomy; and
   creating said enhanced data by embedding said information in said advertising/promotion taxonomy into said merchandise taxonomy.

8. A computer-implemented method of analyzing data comprising plural data elements and presenting the analyzed data for use by a data analyst, comprising the steps of:
   acquiring analysis parameters according to which the data is to be analyzed;
   collecting data elements corresponding to said acquired analysis parameters;
   enhancing said collected data elements in accordance with said analysis parameters;
   performing association analysis on said enhanced data elements to generate enhanced association rules and frequent itemsets that identify:
      market baskets associated with said retail sales transactions; and
      which of said items sold are associated with each of said market baskets; and
   displaying and archiving said enhanced association rules and frequent itemsets.

9. The method as set forth in claim 8, further comprising the step of:
   processing said enhanced association rules and frequent itemsets to develop conclusions about said analyzed data.

10. The method as set forth in claim 9, wherein said collected data elements include merchandise information and advertising/promotion information pertaining to items sold by a retailer, and wherein said enhancement step comprises the steps of:
   classifying said merchandise information in a merchandise taxonomy;
   classifying said advertising/promotion information in an advertising/promotion taxonomy; and
   creating enhanced data elements corresponding to said items sold by said retailer, said enhanced data elements providing a correlation between each item and any advertising/promotion conducted in connection with each item.

11. A computer program product recorded on computer readable medium for analyzing data comprising plural data elements and presenting the analyzed data for use by a data analyst, comprising:
   computer readable means for acquiring analysis parameters according to which the data is to be analyzed;
   computer readable means for collecting data elements corresponding to said acquired analysis parameters;
   computer readable means for enhancing said collected data elements in accordance with said analysis parameters;
   computer readable means for performing association analysis on said enhanced data elements to generate enhanced association rules and frequent itemsets that identify:
      market baskets associated with said retail sales transactions; and which of said items sold are associated with each of said market baskets; and computer readable means for displaying and archiving said enhanced association rules and frequent itemsets.

12. The computer program product as set forth in claim 11, further comprising:

computer readable means for processing said enhanced association rules and frequent itemsets to develop conclusions about said analyzed data.

13. The computer program product as set forth in claim 12, wherein said collected data elements include merchandise information and advertising/promotion information pertaining to items sold by a retailer, and wherein said computer readable means for enhancing includes:

computer readable means for classifying said merchandise information in a merchandise taxonomy;

computer readable means for classifying said advertising/promotion information in an advertising/promotion taxonomy; and computer readable means for creating enhanced data elements corresponding to said items sold by said retailer, said enhanced data elements providing a correlation between each item and any advertising/promotion conducted in connection with each item.

14. A system of analyzing data comprising plural data elements and presenting the analyzed data for use by a data analyst, comprising:

means for acquiring analysis parameters according to which the data is to be analyzed;

means for collecting data elements corresponding to said acquired analysis parameters;

means for enhancing said collected data elements in accordance with said analysis parameters;

means for performing association analysis on said enhanced data elements to generate enhanced association rules and frequent itemsets; and means for displaying and archiving said enhanced association rules and frequent itemsets.

15. The system as set forth in claim 14, further comprising:

means for processing said enhanced association rules and frequent itemsets to develop conclusions about said analyzed data.

16. The system as set forth in claim 15, wherein said collected data elements include merchandise information and advertising/promotion information pertaining to items sold by a retailer, and wherein said means for enhancing comprises:

means for classifying said merchandise information in a merchandise taxonomy;

means for classifying said advertising/promotion information in an advertising/promotion taxonomy; and means for creating enhanced data elements corresponding to said items sold by said retailer, said enhanced data elements providing a correlation between each item and any advertising/promotion conducted in connection with each item.

* * * * *